US006336687B1

(12) United States Patent
Achmad

(10) Patent No.: US 6,336,687 B1
(45) Date of Patent: Jan. 8, 2002

(54) ANTI-LOCK BRAKE SYSTEM THREE WAY DIRECT DRIVE VALVE

(75) Inventor: Muchlis Achmad, Santa Clarita, CA (US)

(73) Assignee: HR Textron, Inc., Chatsworth, CA (US)

(*) Notice: Subject to any disclaimer, the term of this patent is extended or adjusted under 35 U.S.C. 154(b) by 0 days.

(21) Appl. No.: 09/533,897

(22) Filed: Mar. 21, 2000

(51) Int. Cl.$^7$ ................................................. B60T 8/38
(52) U.S. Cl. ..................................................... 303/113.1
(58) Field of Search ........................... 303/113.1, 113.4, 303/116.1, 117.1, 10

(56) References Cited

U.S. PATENT DOCUMENTS 5,328,002 A * 7/1994 Taig ............................ 188/67

* cited by examiner

Primary Examiner—Christopher F. Schwartz
Assistant Examiner—C. T. Bartz
(74) Attorney, Agent, or Firm—Fulbright & Jaworski L.L.P.

(57) ABSTRACT

An automatic breaking system which functions by applying a controlled breaking pressure signal through a control valve to each of the four corners of an automotive vehicle in response to input and feedback signals. A centralized computer receives various signals generated by transducers positioned at various positions within the vehicle including at each of the four corners as well as input signals from the vehicle brake peddle. These signals are processed by the computer and then applied through a control system to a direct drive valve which meters the application of the fluid under pressure to the breaks located at each corner of the vehicle. Direct drive valve is a limited angle rotary to linear direct drive valve which includes a housing having a first bore longitudinally disposed therethrough and a second bore disposed transversely therethrough and intersecting the first bore. A valve spool is slidably disposed within a second bore for controlling the flow of fluid under pressure. A motor is disposed within the first bore and includes a limited angle rotary shaft having an eccentrically disposed pin extending therefrom into engagement with a slot and a spool. A spring is disposed within the second bore and continuously urges the spool into engagement with the pin. As signals are applied to the motor the valve spool reciprocates and causes flow of fluid under pressure as above specified.

7 Claims, 3 Drawing Sheets

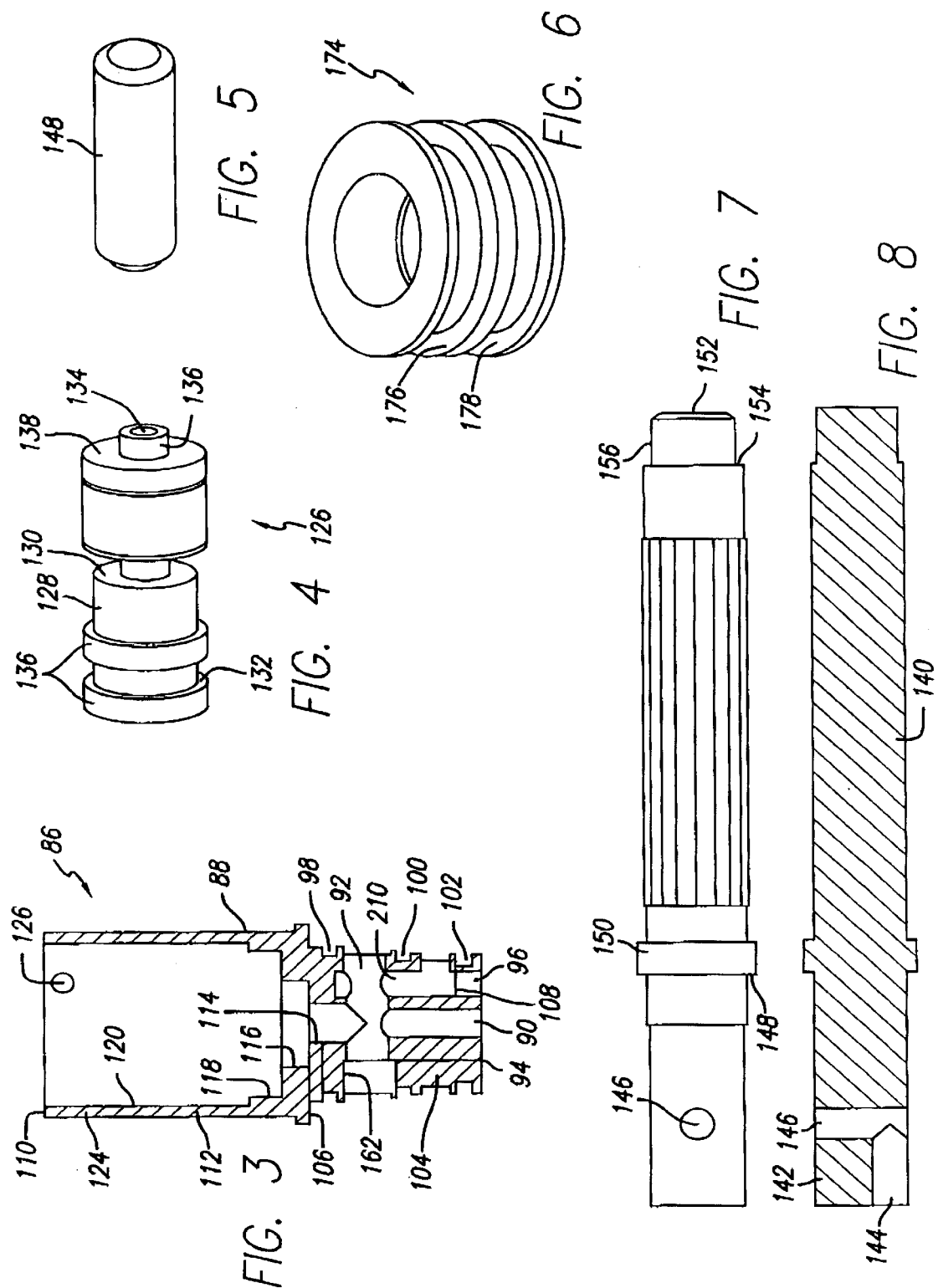

ANTI-LOCK BRAKE SYSTEM THREE WAY DIRECT DRIVE VALVE

BACKGROUND OF THE INVENTION

1. Field of the Invention

This invention relates generally to brake control systems and more particularly, to an anti-lock brake system which includes as an operable part thereof a three way direct drive valve used for the control of the application of fluid under pressure to the brakes of an automotive vehicle.

2. Description of the Related Art

Various types of anti-skid brake systems (ABS) are in existence and operate quite satisfactorily for the purposes intended. Typical of such prior art systems is the utilization of a manually operated master cylinder in conjunction with an electrically controlled valving operation. The electrically controlled valve normally is not operable until a predetermined relationship exists between the pressure of the fluid in the master cylinder and that of the fluid in the electrically operated system.

In numerous such systems, solenoid-type valves are utilized as the electrical or electronically controlled portion of the ABS system.

Typical of such prior art systems are those shown in U.S. Pat. Nos. 4,130,322; 4,838,313; 5,221,126 and 5,244,260.

As above indicated, such systems operate quite well for the purposes intended, however, they are relatively complex and expensive and the valves utilized therein add to the complexity and cost of the overall system.

SUMMARY OF THE INVENTION

In accordance with the principles of the present invention there is provided a limited angle rotary to linear direct drive automatic brake control valve for use in ABS systems on automotive vehicles. The valve includes a housing having a first bore longitudinally disposed therethrough and a second bore disposed transversely therethrough and intersecting the first bore. A spool is slidably disposed within the second bore for controlling the flow of fluid under pressure. A motor is disposed within the first bore and includes a limited angle rotary shaft having an eccentrically disposed pin extending therefrom into engagement with a slot in the spool. A spring is disposed within the second bore and continuously urges the spool into engagement with the pin. A source of fluid under pressure is applied to the second end of the spool and means is provided to apply an electrical signal to the motor to rotate the shaft so that the pin moves the spool to control the application of fluid under pressure to a brake within the automotive vehicle.

Other objects and advantages of the present invention will become more apparent to those persons having ordinary skill in the art to which the present invention pertains from the foregoing description taken in conjunction with the accompanying drawings.

FIG. is a schematic illustration partly in cross-section of a rotary to linear direct drive valve constructed in accordance with the principles of the present invention;

FIG. 3 is a cross-sectional view illustrating the housing of the valve;

FIG. 4 is a perspective view of a spool utilized within the valve;

FIG. 5 is a perspective view of a dowel pin used in the valve;

FIG. 6 is a plug us ed in the lower portion of the valve;

FIG. 7 is an elevational view of the shaft utilized as part of the motor of the valve; and FIG. 8 is a cross-sectional view of the shaft taken about the lines 8—8 of FIG. 7.

DETAILED DESCRIPTION OF THE PREFERRED EMBODIMENTS

The automatic braking system which is utilized in conjunction with the direct drive valve of the present invention functions by applying a controlled braking pressure signal through a control valve to each of the brakes of an automotive vehicle in response to input and feedback signals. Generally, a centralized computer receives various signals including a signal generated by the driver of the vehicle engaging the brake foot peddle as well as signals generated by various transducers positioned at various positions within the vehicle such as wheel speed sensors, steering angle sensors, lateral acceleration sensors, yaw rate sensors, the pressure at each of the brakes and the like. These signals are processed by the computer and then applied through a control system to a direct drive valve which meters the application of the fluid under pressure to each of the brakes at each of the wheels of the automotive vehicle to assist in controlling the vehicle and providing additional stability not otherwise available.

Figure 1:
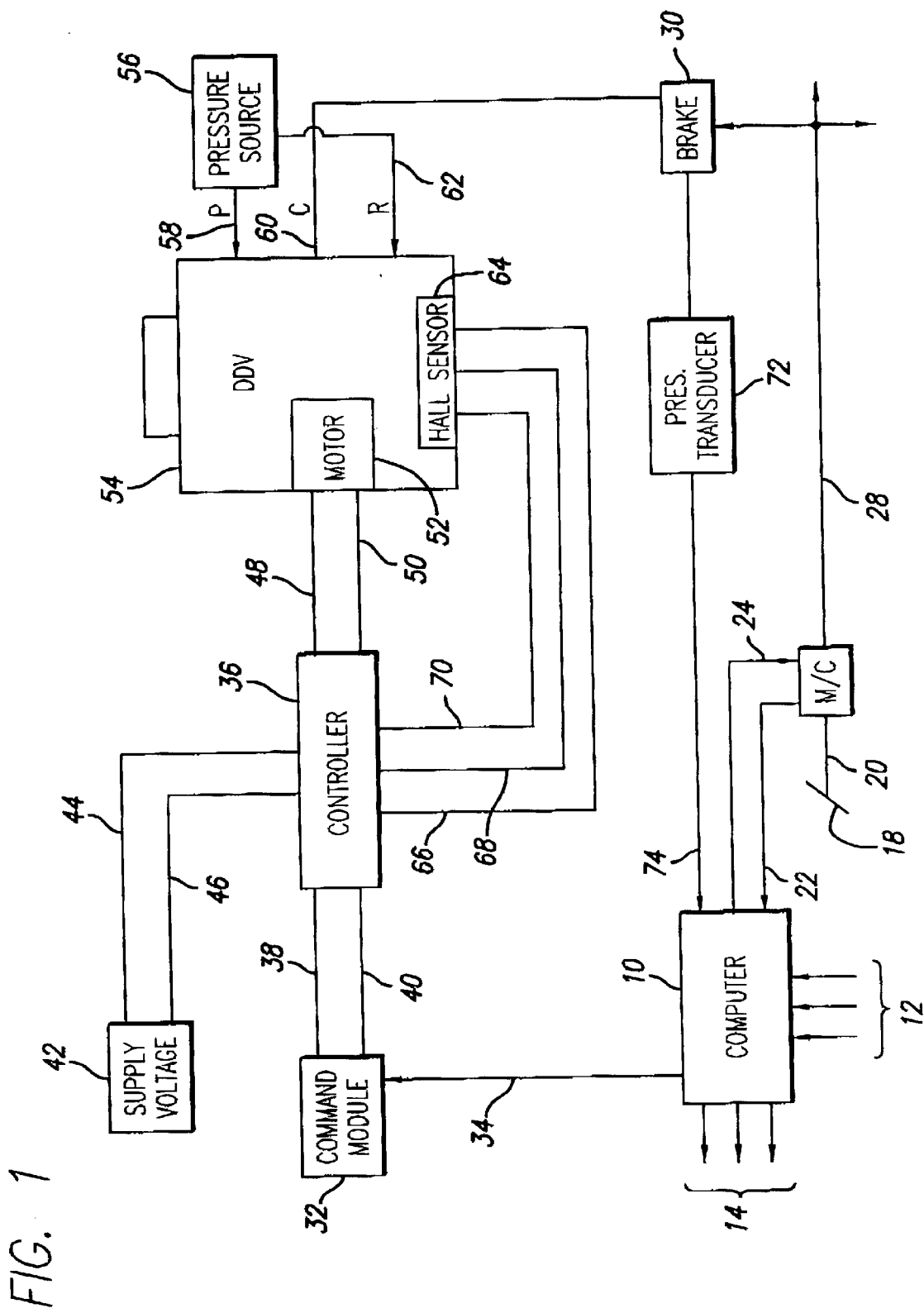
FIG. 1 is a schematic diagram of a system utilizing the rotary to linear direct drive valve constructed in accordance with the principles of the present invention.

FIG. 1 illustrates in schematic form a system in which the valve of the present invention is used.

As is therein shown, there is provided a central computer 10 which has applied thereto various input signals 12 and which produces in response to those signals and appropriate computer programs a series of output signals generally shown at 14. Also included within the overall system is a master cylinder 16 and a brake foot peddle 18 which are interconnected as shown by the dash line 20. One of the input signals to the computer 10 will be the pressure applied to the brake foot peddle 18 by the operator of the vehicle. This signal may be represented by the lead 22 which is connected between the master cylinder and the computer 10.

In normal operation of a system constructed in accordance with the present invention the output from the master cylinder would not normally be applied to the vehicle's brakes. The master cylinder is used as an emergency stopping device for the vehicle in the event the remainder of the system malfunctions. In the event of such a malfunction, the computer 10 will provide an activating signal over the lead 24 to open a selector valve 26 within the master cylinder to allow application of brake fluid through the master cylinder 16 and the selector valve 26 as well as the passageway 28 to the vehicle brake 30. As above indicated, such will occur only when the remainder of the system has failed. The vehicle brake 30 has connected to it the remainder of the system which functions to apply fluid under pressure to the brake in response to the output signals from the computer 10 to assist in braking the automobile and to maintain stability of control thereof. As is recognized by those skilled in the art, each automotive vehicle will contain at least four wheels and four brakes. The remainder of the system as shown in FIG. 1 and to be described hereinafter, is to be provided for each wheel, or corner, of the vehicle. Thus independent and individual control of each wheel of the vehicle may be accomplished through utilization of the computer 10 in conjunction with the remainder of the system as shown generally in FIG. 1.

As is shown in FIG. 1, the output signals from the computer 10 are applied to a command module 32 such as by way of signals being passed over the lead 34 from the computer 10. A command module is in place for each corner of the vehicle. Output signals from the command module in response to the input signal from the computer 10 are unique to each corner of the vehicle. The output signals from the command module are applied to a controller 36 by way of the leads 38 and 40. The controller 36 receives a supply voltage from a source 42 thereof which is applied over the leads 44 and 46. Output signals from the controller 36 are applied by way of the leads 48 and 50 to the motor 52 of a direct drive valve (DDV) 54. As will be described more in detail hereinafter, the motor functions to move a valve housed within the DDV which in turn controls the application of fluid under pressure from a source 56 thereof which flows through the passageway 58 up through the valve and a control passageway 60 and the selector valve 26 to the brake 30. Return fluid flows from the master cylinder 16 and the control valve 54 through the passageway 62 to the return of the pressure source 56. A Hall Effect sensor 64 is utilized to sense the position of the motor shaft which drives the valve within the DDV 54. This position signal is applied by way of the lead 66, 68 and 70 as a feedback signal to the controller 36. The brake 30 has a pressure transducer 72 connected thereto. The pressure transducer 72 provides an electrical signal over the lead 74 which is proportional to the pressure which is being applied to the brake 30. Such a pressure transducer is connected to the brake at each corner of the vehicle.

Figure 2:
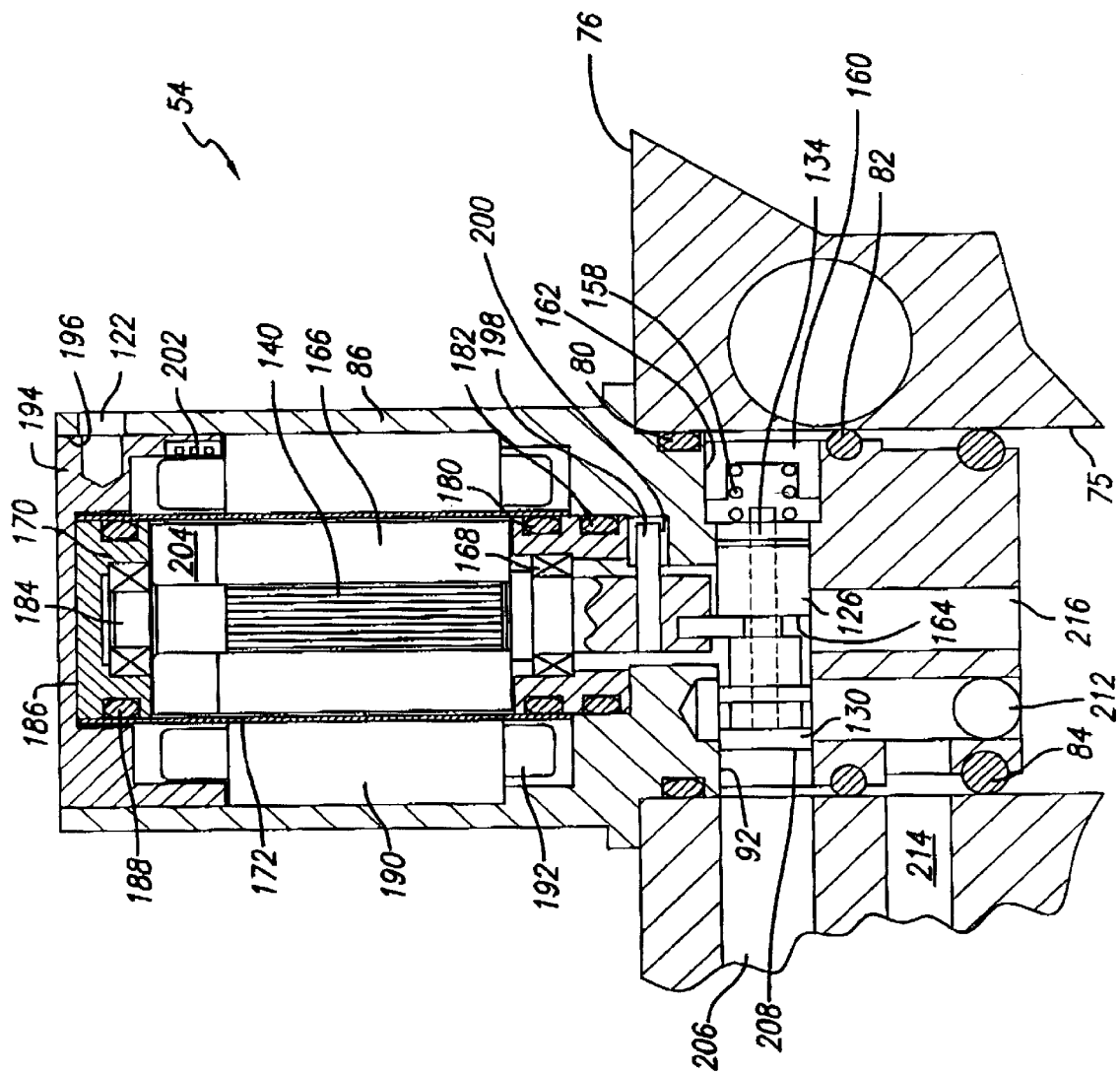

The direct drive valve 54 is shown in an assembled cross-sectional view in FIG. 2. Various component parts of the valve as shown in FIG. 2 are further illustrated in more detail in FIGS. 3 through 8, therefore, the following description is with respect to FIGS. 2 through 8. The valve 54 as illustrated in FIG. 2 is shown inserted into a manifold 76 or similar such apparatus which provides fluid passageways to the brake 30 at a particular corner of the vehicle. As is illustrated, the manifold 76 provides an opening 78 within which the valve 54 is received. "O" rings 80, 82 and 84 are received within appropriate grooves formed in the lower portion of the housing 86 of the valve 54. The "O" rings" 80, 82 and 84 define particular flow paths for the fluid under pressure and return as will be described more fully below.

By reference now to FIG. 3 the housing 86 is shown in additional detail. The housing 86 includes a body 88 defining a first bore 90 disposed longitudinally therethrough. The body 88 includes a second bore 92 which is disposed transversely therethrough and which intersects the first bore 90. The first bore 90 as it progresses from the base 94 of the housing 88 upwardly as viewed in FIG. 3 has a diameter which progressively increases as illustrated in FIG. 3. Each of these increased diameter bores define cavities which receive various of the additional components of the direct drive valve 54 as will be more fully described herein below.

The body 88 also defines a third bore 96 which is also longitudinally disposed but is off-set from the first bore 90. The third bore 96 also intersects the second bore 92. "O" ring groves 98, 100 and 102 are also provided in the lower portion 104 of the body 88 which portion extends below the outwardly directed flange 106. A shoulder 108 is provided in the bore 96 by a re-entrant bore therein initiated from the base 94.

It should also be understood that the increasing diameters of the first longitudinal bore 90 are provided by re-entrant bores from the top 110 of the upper portion 112, above the flange 106, of the housing 86. The first re-entrant bore 114 receives a shaft extending from the motor, the second re-entrant bore 116 receives a lower plug, the third re-entrant bore receives coils on the motor and the forth re-entrant bore 120 receives the core of the motor stator as well as an appropriate upper plug. The various components immediately above referred to will be described in more detail hereinafter. The upper portion 112 of the housing 54 also defines a pair of openings 122 and 124 for receiving fasteners to retain the upper plug in position.

A spool 126 is slidably disposed within the second bore 92 as is shown in FIG. 2. The spool 126 includes a center reduced diameter section 128, FIG. 3, which further defines a slot 130 circumferentially disposed therein. Slot 130 is designed to receive a pin extending from the shaft of the motor to be described more fully below. The spool 126 includes a land 130 which has a reduced diameter portion 132 provided therein. The land 130 is used to control the flow of fluid through the direct drive valve from the source to the brake. An opening 134 is provided through the spool 126 to provide pressure balancing across the valve. A stub shaft 136 extends from the face 138 and is used to retain a spring which functions in a manner to be described below.

Referring now more particularly to FIG. 7 and 8, there is illustrated a shaft which is an integral part of the motor 52 of the direct drive valve 54. As is illustrated particularly in FIG. 8, the shaft is a solid metallic member 140 which at its lower end 142 includes a longitudinal bore 144 and also provides a transverse bore 146. The bore 144 is eccentrically disposed. The bore 144 receives a pin 148, as illustrated in FIG. 5, by press fit. The pin 148 extends into the grove 130 provided in the spool 126 and is used to drive the spool for control of fluid flow from the source 56 thereof. A pin similar to that shown at 148 in FIG. 5 is also received by press fit in the bore 146 of the shaft 142 and is used to limit the rotary travel of the shaft 142. A lower shoulder 149 is provided by a flange 150 on the shaft. At the upper end 152 of the shaft, there is also provided an additional shoulder 154 by providing a reduced diameter in section as shown at 156 on the shaft.

As is illustrated more particularly in FIG. 2, to which reference is hereby made, the spool 126 is received within the bore 92 and is slidable therein. The pin 148 is received within the slot 130 in the spool and bears there against. A spring 158 is seated on the face 138 of the spool and is held in place by the stub shaft 136. A cap 160 is press fitted into an enlarged opening 162 provided by a re-entrant bore into the bore 92. The cap retains the spring 158 in place and constantly urges the spool 126 toward the left as viewed in FIG. 2 so as to maintain the face 164 of the spool 126 in constant engagement with the pin 148.

The shaft 140 forms part of the rotor 166 of the motor 52 in the direct drive valve. The shaft is supported at its lower end by a bearing 168 and at its upper end by an additional bearing 170. The bearing 168 is seated against the shoulder 149 while the bearing 170 is seated against the shoulder 154. The rotor 166 is positioned within an isolation tube 172. As is illustrated the isolation tube is a right circular cylinder open at both ends. A lower plug 174 as shown in FIG. 6 is inserted within the lower end of the isolation tube 172. The lower plug includes a pair of grooves 176 and 178 for receiving "O" rings 180 and 182. The lower plug 174 is seated within the second enlarged diameter 116 in the body of the housing 86. The "O" ring 182 seats against the wall of the enlarged diameter 116 and acts as a seal with respect to fluid appearing in the rotor. The "O" ring 182 provides this seal. The "O" ring 180 is seated against the lower end of the isolation tube and provides a seal at that point.

At the upper end of the isolation tube 172 there is provided a top plug 184 which also defines a groove 186 within which there is seated an additional "O" ring 188. This "O" ring also provides a seal with respect to any fluid that may be contained within the rotor 166. The particular construction of the rotor in that it includes permeant magnets and is positioned to rotate within the interior portion of the motor 52 as well known to those skilled in the art and additional detail with respect to the permeant magnets, their attachment to the shaft 140 and the like are well known to those skilled in the art and need not be given here. The stator 190 is seated externally of the isolation tube 172 with the coils 192 seated within the third enlarged diameter area of the housing 86 as shown at 118. The permeant magnet portion of the stator 190 is seated within the last enlarged diameter area as shown at 120.

After assembly of the isolation tube with the top and lower plugs and the bearing as above described, it is inserted such that the pin 148 is disposed within the slot 130 against the surface 164. The stator is assembled as illustrated and thereafter a cap 194 is inserted by press fitting into the upper opening of the housing 86 as illustrated in FIG. 3. Once in place, appropriate fasteners are inserted through the openings as shown at 122 and threaded into threaded openings 196 in the cap 194 thereby securing the various components of the motor 52 in place within the housing 86.

As is also illustrated in FIG. 2, the additional pin 198 (which is similar to the pin 148 as shown in FIG. 5) is received within the transverse opening 146 in the shaft 140 and impinges against stops as illustrated at 200 to limit the travel of the shaft 140.

To provide signals proportionate to the rotary position of the shaft 140, there is provided a Hall Effect sensor 202 which is seated internally of the housing 86 and is secured in place. The permeant magnets such as shown at 204 on the rotor 166 provide excitation for the Hall Effect sensor 202 to provide an output signal which is proportional to the rotary position of the shaft 140. Such information as indicated above is fed back to the controller to adjust the controller to provide appropriate signals to the stator 190 of the motor 52.

Fluid under pressure from the source 56 is applied to the passageway 206 in the manifold 76 and is retained in place between the "O" rings 80 and 82. As can be seen, the fluid under pressure engages the surface 208 of the land 130 on the spool 126. The land 130 as is illustrated, when the spool 126 is in the position as shown in FIG. 2 closes the opening 210 of the bore 96. The opposite end of the bore 96 is closed by a ball 212 which is press fitted therein and which engages the shoulder 108 which functions as a seal against the outer periphery of the ball 212.

As electrical signals are applied to the motor 52 over the leads 48 and 50 from the controller 56, the rotor 166 will rotate through a predetermined angle depending upon the polarity and magnitude of the signals applied to the stator 190. Such rotation causes the eccentrically disposed pin 148 bearing against the surface 146 to move the spool 126 toward the right against the force of the spring 158 by an amount proportional to the rotation of the shaft 140. As the spool moves toward the right the land 130 opens the upper opening 210 thus allowing fluid under pressure in the passageway 206 to flow past the land and into the bore 96. Since the bore 96 at its lower end is block by the ball 212, the fluid under pressure will flow through the passageway 214 and out to the brake 30 through the conduits 60, 28 as above described. Return fluid will enter the bore 90 at its opening 216 and through an appropriate opening in the manifold (not shown) return to the sump or return of the pressure source 56 through the conduit 62 as is well known to those skilled in the art.

Upon release of the signal applied to the rotor 190, the spring 158 will return the spool 126 to its null position as shown in FIG. 2 during which no braking fluid is applied to the brake 30. As indicated above, the opening 134 as shown in dashed lines in FIG. 2 allows fluid present in the passageway 206 to pass through the spool and into the area surrounding the cap 160 thereby to pressure balance the spool 126. It will recognized by those skilled in the art from viewing the drawings and the above description that the direct drive valve of the present invention has been reduced to its minimum costs by providing the housing which has been drilled to provide the various bores for receipt of the spool and the motor thus reducing it to its simplest form while maintaining operativeness such as is required for automatic brake control systems for automotive vehicles.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

1. A limited angle rotary to linear direct drive automatic brake control valve for automotive vehicles comprising:
    a housing having a body defining a first bore disposed longitudinally therethrough and a second bore disposed transversely therethrough intersecting said first bore;
    a spool having first and second ends slidably disposed within said second bore and having a slot formed therein;
    a motor disposed within said first bore including a limited angle rotary shaft having an eccentrically disposed pin extending therefrom into said slot in said spool;
    a spring disposed within said second bore and seated against said first end of said spool and continuously urging said spool into engagement with said pin;
    means for applying a source of fluid under pressure to said second end of said spool; and
    means for applying an electrical signal to said motor to rotate said shaft whereby said pin linearly moves said spool to control the application of fluid under pressure to brake said automotive vehicle.

2. A brake control valve as defined in claim 1 wherein said motor includes a rotor and a stator, an isolation tube of non-magnetic material isolating said stator from said rotor, said isolation tube including a right circular cylinder having first and second open ends and first and second plugs sealingly received within said first and second ends.

3. A brake control valve as defined in claim 1 wherein said housing defines a third bore disposed longitudinally therein intersecting said second bore, said spool closing said third bore at said intersection with said second bore in the absence of electrical signals applied to said motor and opening said intersection upon the application of electrical signals to said motor to permit the flow of fluid under pressure through said third bore.

4. A brake control valve as defined in claim 2 wherein said first and second plugs carry said shaft.

5. A brake control valve as defined in claim 4 further including first and second "O" rings carried by said first and second plugs respectively for sealing said first and second ends.

6. A brake control valve as defined in claim 3 which further includes means for sealing said third bore at distal ends thereof opposite said intersection between said second and thirds bores.

7. A brake control valve as defined in claim 6 wherein said means for sealing said third bore is a ball press fitted into said distal end.

* * * * *